United States Patent
Rivas et al.

(10) Patent No.: US 7,056,088 B2
(45) Date of Patent: Jun. 6, 2006

(54) STEAM TURBINE ROTOR TEMPERATURE CONTROL AT OIL DEFLECTOR

(75) Inventors: Flor Del Carmen Rivas, Clifton Park, NY (US); Gene David Palmer, Clifton Park, NY (US); John Cleland Lavash, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 126 days.

(21) Appl. No.: 10/709,203

(22) Filed: Apr. 21, 2004

(65) Prior Publication Data

US 2005/0238485 A1    Oct. 27, 2005

(51) Int. Cl.
*F04D 29/05* (2006.01)

(52) U.S. Cl. .................... 415/174.5; 415/216.1

(58) Field of Classification Search ............. 415/174.5, 415/216.1
See application file for complete search history.

(56) References Cited

U.S. PATENT DOCUMENTS

| 2,846,245 | A | * | 8/1958 | Weaver ...................... 277/412 |
| 3,942,804 | A | * | 3/1976 | Andress et al. ............. 277/412 |
| 4,350,345 | A | * | 9/1982 | Kalan et al. ................. 277/412 |
| 4,402,514 | A | | 9/1983 | Ryan et al. |
| 5,593,274 | A | | 1/1997 | Carreno et al. |
| 6,158,102 | A | | 12/2000 | Berry et al. |
| 6,382,903 | B1 | | 5/2002 | Caruso et al. |
| 6,397,604 | B1 | | 6/2002 | Eldrid et al. |
| 6,438,837 | B1 | | 8/2002 | Berry et al. |
| 6,481,969 | B1 | | 11/2002 | Berry et al. |

* cited by examiner

*Primary Examiner*—Edward K. Look
*Assistant Examiner*—Richard A. Edgar
(74) *Attorney, Agent, or Firm*—Nixon & Vanderhye P.C.

(57) ABSTRACT

A turbine comprises an oil deflector including at least one set of seal rings, and a shaft including an annular step. The step includes a circumferential surface in proximity to the seal rings of the oil deflector and a side surface extending radially from a center portion of the shaft and defining a groove positioned radially underneath the circumferential surface.

23 Claims, 7 Drawing Sheets

STEAM TURBINE ROTOR TEMPERATURE CONTROL AT OIL DEFLECTOR

BACKGROUND OF INVENTION

The present invention relates to machines such as turbines, and more particularly to a turbine having a rotor and an oil deflector in which the temperature of the rotor near the oil deflector is reduced.

FIGS. 1–3 illustrate a section of a known steam turbine. The steam turbine includes a rotating shaft and an oil deflector. Bearings of the steam turbine provide lubrication oil. While the bearing housing confines much of the lubrication oil, some of the oil leaks and travels axially along the shaft. The oil deflector confines this oil through a plurality of seal rings or "teeth" to allow the oil to be drained.

Due to the relatively high operating temperatures of the steam turbine, oil in the vicinity of the oil deflector may carbonize. In particular, oil within the seal rings is prone to carbonize when subject to high temperatures. The degree of oil carbonization increases with temperature. The carbonized oil is often hard enough to damage the rotating shaft. For example, the carbonized oil is often hard enough to cut grooves in the rotating shaft. While heat shields and the use of lubrication oil as a coolant help control temperature to some degree, they have not been completely successful in preventing oil carbonization at the oil deflector.

It would therefore be beneficial to reduce the temperature of the rotor in the vicinity of the oil deflector to thereby prevent oil carbonization. Damage to the rotor due to oil carbonization can therefore be minimized.

SUMMARY OF INVENTION

A turbine is provided which comprises an oil deflector including at least one set of seal rings and a shaft including an annular step. The step has a circumferential surface in proximity to the seal rings and a side surface extending radially from a central portion of the shaft and defining a groove positioned radially underneath the circumferential surface. The step may further include another side surface extending radially from the central portion of the shaft, the groove extending axially toward the another side surface. The shaft may comprise an intermediate pressure rotor shaft. Alternatively, the shaft may further include a thrust bearing enclosure which extends radially from the central portion of the shaft, the step projecting axially away from the thrust bearing enclosure. The shaft may comprise a high pressure rotor shaft. The circumferential surface of the step may define an oil slinger pocket.

In another exemplary embodiment, a rotary shaft of a turbine comprises an axially extending central portion and an annular step projecting radially from the central portion. The step has a circumferential surface and a radially extending side surface which defines a groove positioned radially underneath the circumferential surface. The rotary shaft may be a high pressure rotary shaft or an intermediate pressure rotary shaft. The step may further include another side surface extending radially from the central portion of the shaft, the groove extending axially toward the another side surface. Alternatively, the shaft may further comprise a thrust bearing enclosure extending radially from a central portion of the shaft, the step projecting axially away from the thrust bearing enclosure. The circumferential surface of the step may define an oil slinger pocket.

In another exemplary embodiment, a turbine comprises a first oil deflector including at least one set of seal rings, a second oil deflector including at least one set of seal rings, and a shaft including a first annular step and a second annular step. The first annular step has a circumferential surface in proximity to the seal rings of the first oil deflector and the second annular step has a circumferential surface in proximity to the seal rings of the second oil deflector. At least one of the annular steps may further include a radially extending side surface which defines a groove positioned radially underneath the circumferential surface of that annular step. For example, the first annular step may include a radially extending side surface which defines a groove positioned radially underneath the circumferential surface of the first annular step and the second annular step may include a radially extending side surface which defines a groove positioned underneath the circumferential surface of the second annular step.

DETAILED DESCRIPTION

Figure 1:
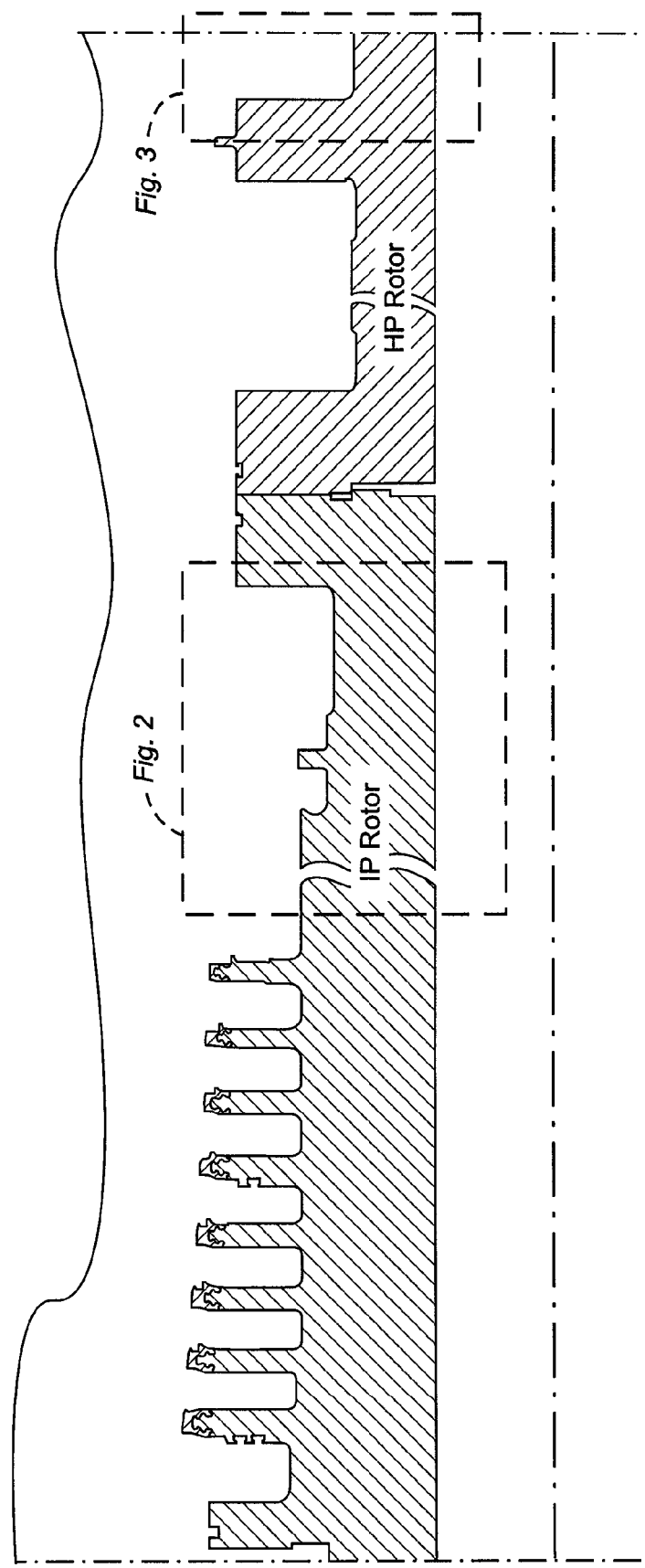
FIG. 1 is a cross-sectional view of a known turbine section.
Figure 2:
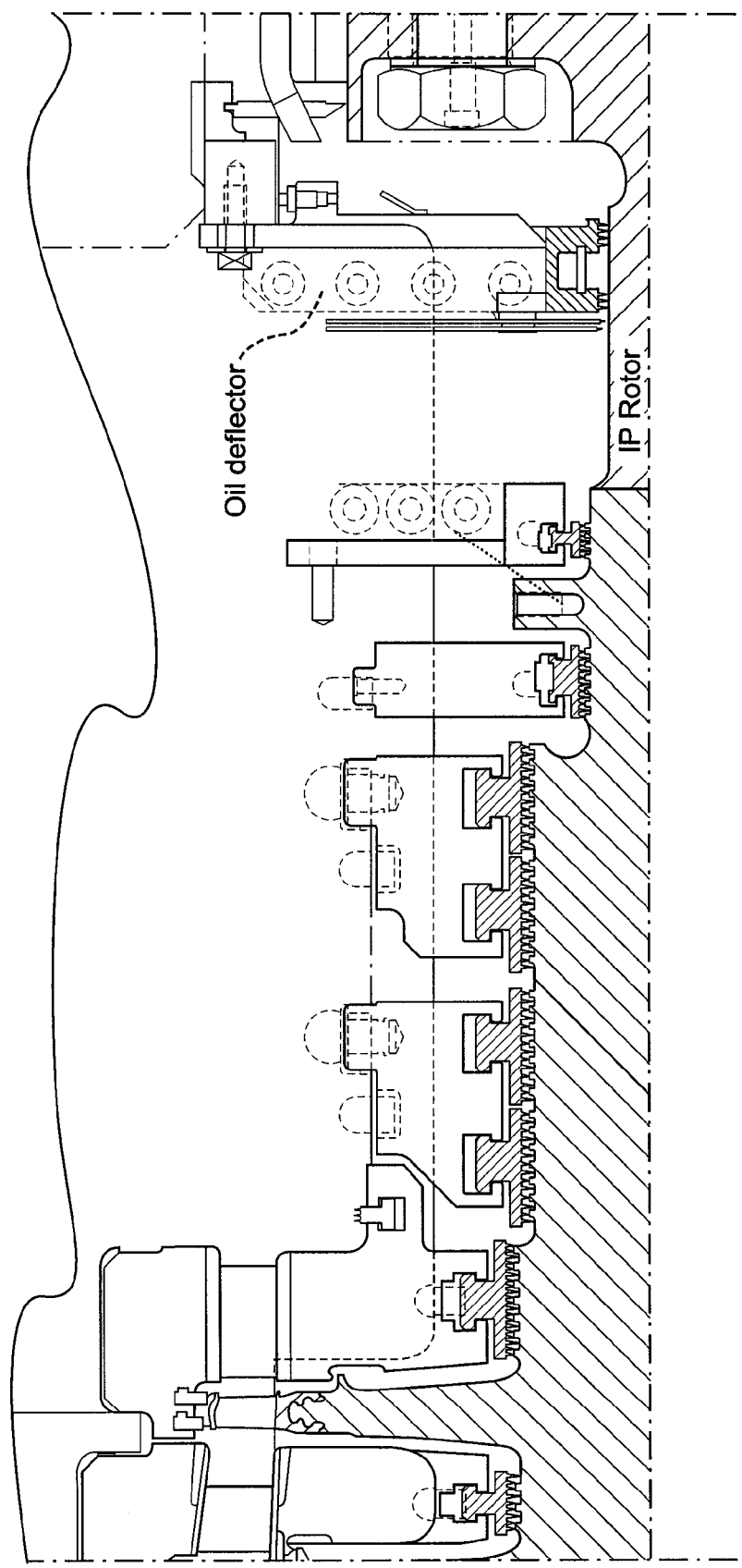
FIG. 2 is a detailed cross-sectional view of a part of the known turbine section illustrated in FIG. 1.
Figure 3:
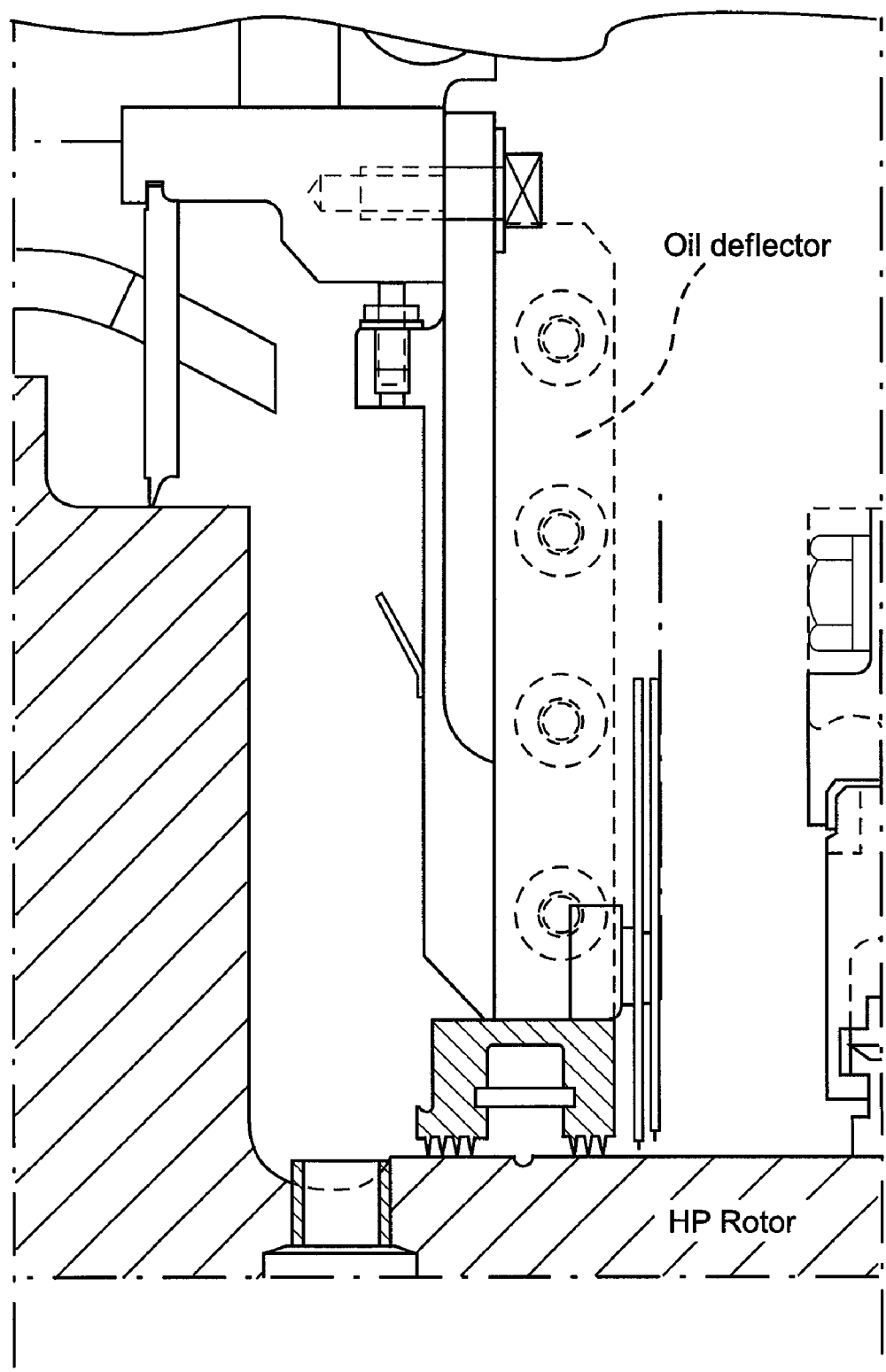
FIG. 3 is a detailed cross-sectional view of another part of the known turbine section illustrated in FIG. 1.

FIGS. 4–7 illustrate a steam turbine in accordance with an exemplary embodiment. The steam turbine includes, for example, rotatable shaft 10, oil deflector 30, end packings 40, bearings 42 and oil deflector 60.

Figure 4:
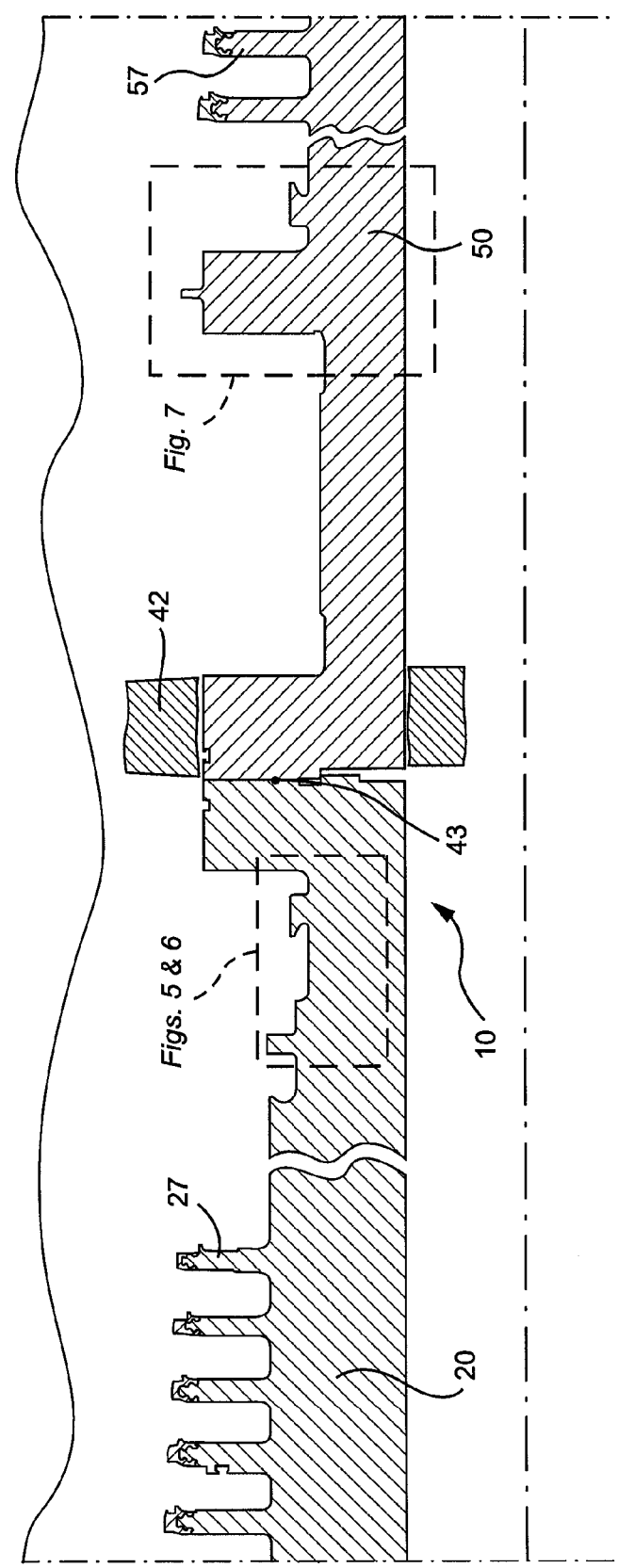
FIG. 4 is a cross-sectional view of a turbine section in accordance with an exemplary embodiment of the present invention.

Referring to FIG. 4, shaft 10 includes an intermediate pressure (IP) rotor shaft portion 20 and a high pressure (HP) rotor shaft portion 50. IP rotor shaft portion 20 includes stages 27 for holding buckets (not shown for clarity) upon which intermediate pressure steam is blown to rotate shaft 10. HP rotor shaft portion 50 includes stages 57 for holding another set of buckets (not shown for clarity) upon which high pressure steam is blown to rotate shaft 10. IP rotor shaft portion 20 and HP rotor shaft portion 50 are connected together at joint 43.

Figure 5:
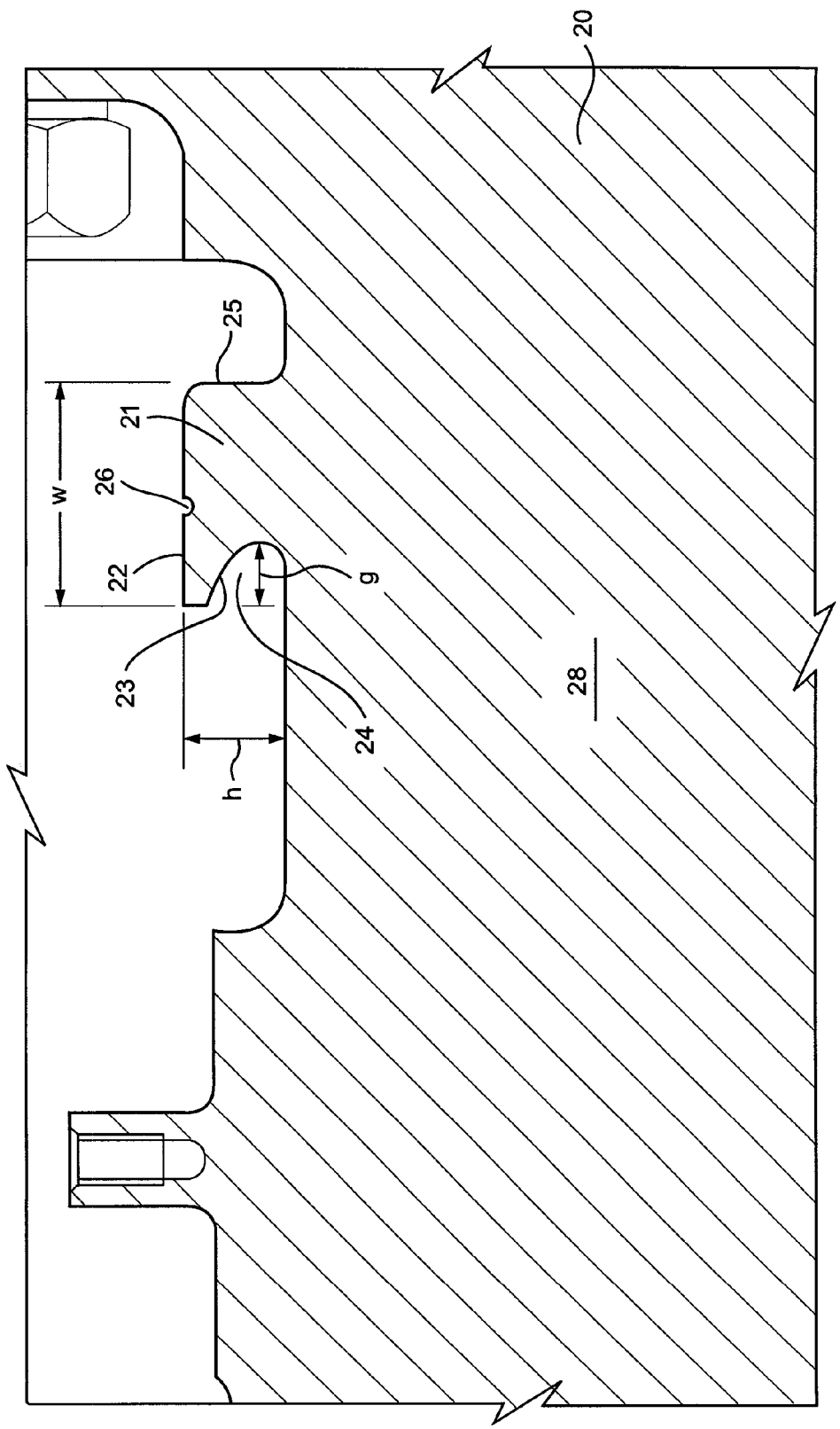
FIG. 5 is a more detailed view of a part of the turbine section illustrated in FIG. 4.

Referring now to FIG. 5, IP rotor shaft portion 20 includes an annular step 21 which projects radially from center portion 28 of shaft 10. Step 21 includes a circumferential surface 22 which forms a radially outermost edge portion of step 21. Circumferential surface 22 defines an oil slinger pocket 26. Oil slinger pocket 26 forms an annular groove which allows oil to be trapped and collected for drainage. Step 21 also includes two side surfaces 23 and 25 extending in the radial direction away from central portion 28. Surface 23 defines an annular groove 24 which is positioned radially underneath a portion of circumferential surface 22. Exemplary (but in no way limiting) dimensions of step 21 are as follows: w=3.5 inches, h=1.625 inches and g=1.06 inches.

Figure 6:
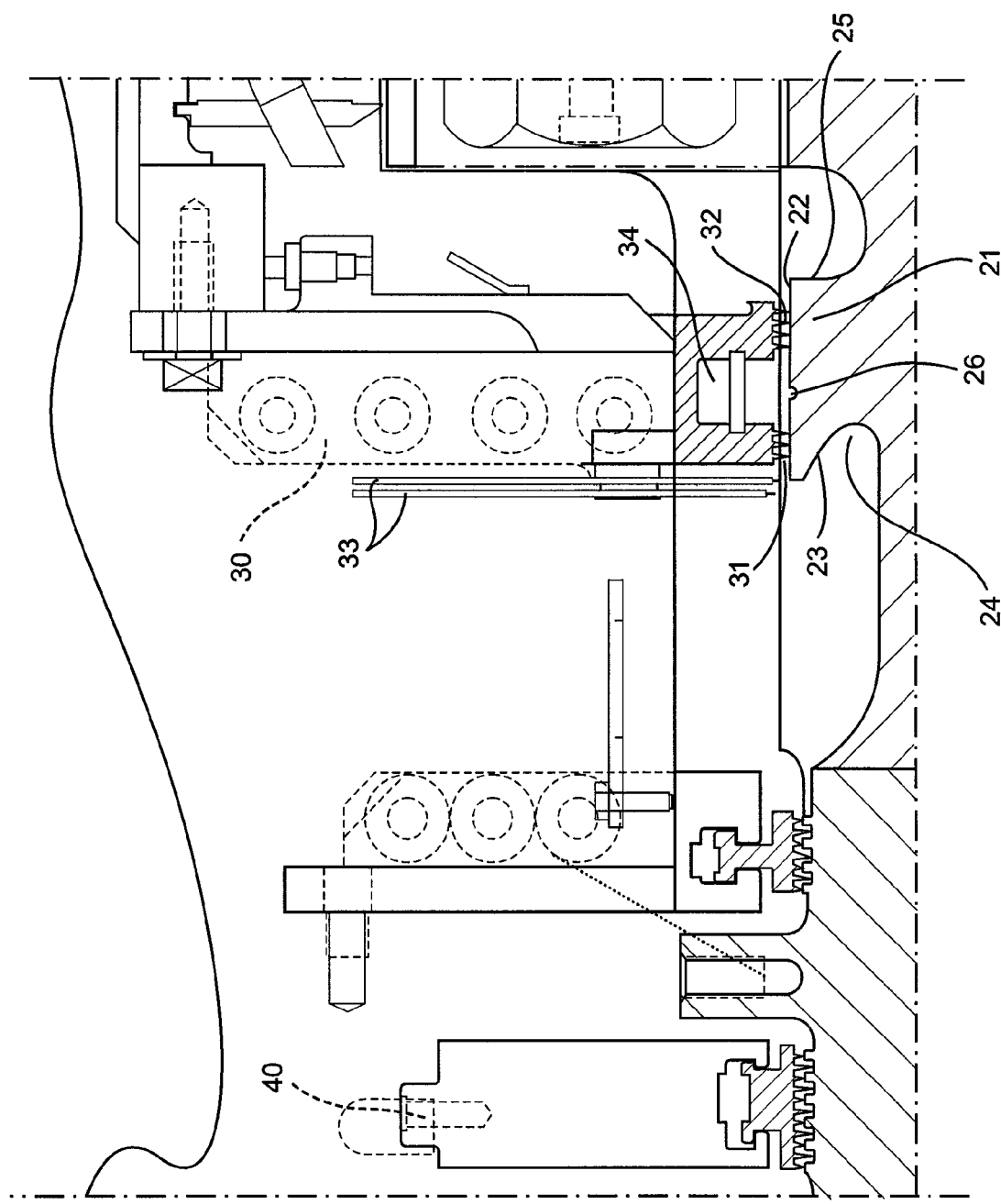
FIG. 6 is a cross-sectional view illustrating, inter alia, a more detailed view of a part of the turbine section illustrated in FIG. 4.

Referring now to FIG. 6, oil deflector 30 includes heat shields 33, a set of seal rings 31 and another set of seal rings 32. Heat shields 33 protect seal rings 31 and 32 from radiated heat transferred from end packings 40. End packings 40 are designed to prevent steam from leaking toward other turbine components such as oil deflector 30.

Seal rings 31 and 32 each encircle a portion of step 21 of shaft 10. Each of seal rings 31 and 32 has a radially innermost edge which is in close proximity to circumferential surface 22 of step 21. A small working clearance is defined between the radially innermost edge of each of seal rings 31 and 32 and circumferential surface 22 which forms the radially outermost edge of step 21.

Seal rings 31 and 32 of oil deflector 30 provide a seal against oil leakage which travels axially along shaft 10. Oil may begin leaking, for example, from bearing 42 and travel along shaft 10. An annular chamber 34 is formed between the sets of seal rings 31 and 32 and opposite oil slinger pocket 26 so that the oil can be collected and drained.

Step 21 provides a rotor geometry which prevents the overheating of oil in the area of oil deflector 30. In particular, annular groove 24 reduces the amount of heat-conductive material that would otherwise form step 21 and thus diminishes the heat transferred to the area of rotor 10 near seal rings 31 and 32 through the heat conductive material forming shaft 10. Moreover, air flowing in groove 24 will cool step 21 and a part of central portion 28 which is close to groove 24 as shaft 10 rotates at a high speed. Rotor 10, and hence the oil in the vicinity of rotor 10 and oil deflector 30, will thus not be overheated. In particular, the temperature of the oil near oil deflector 30 is controlled to be less than 300° F. Oil carbonization near oil deflector 30 can therefore be prevented, thereby minimizing damage to shaft 10 and oil deflector 30.

Figure 7:
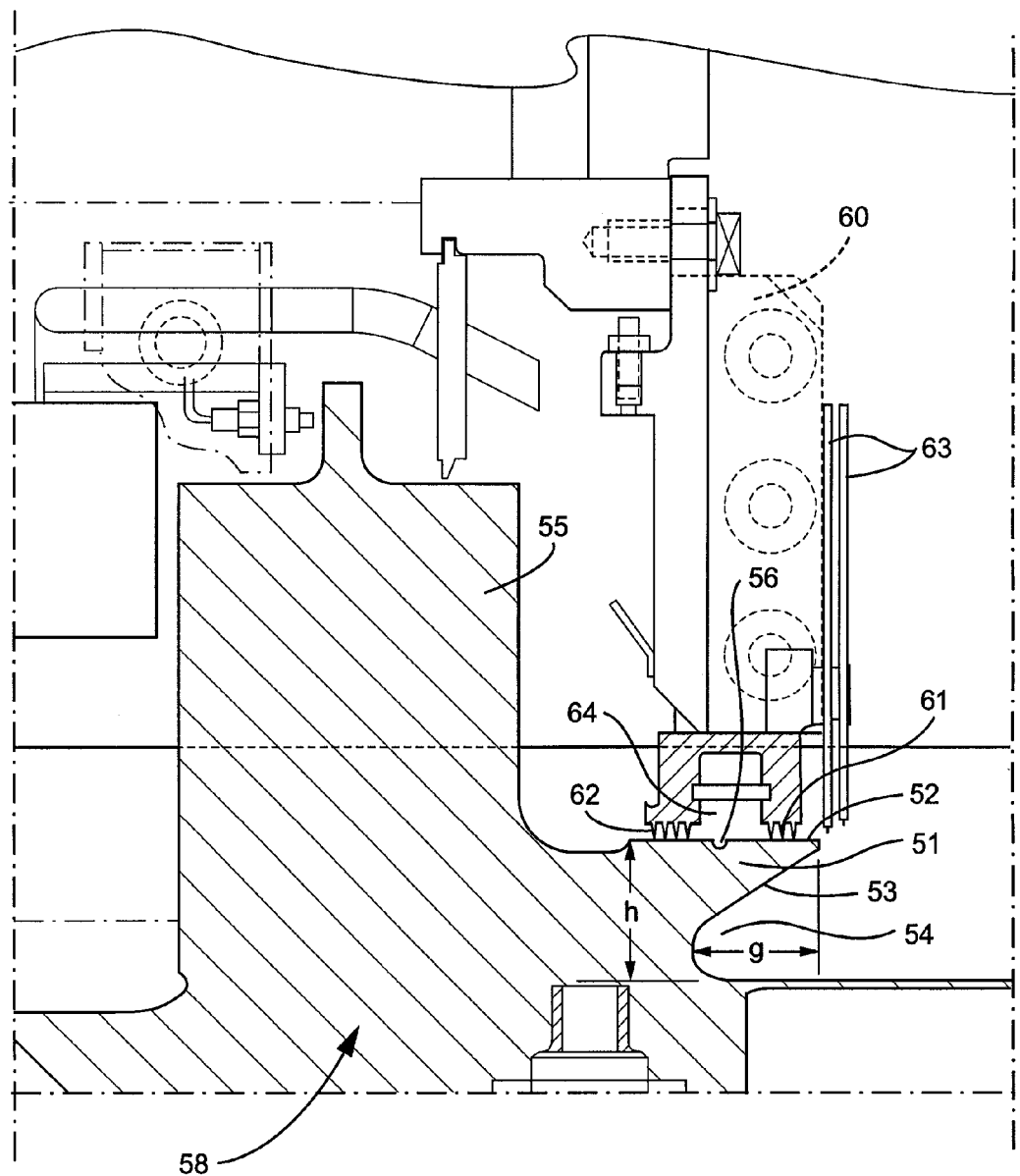
FIG. 7 is a cross-sectional view illustrating, inter alia, a more detailed view of another part of the turbine section illustrated in FIG. 4.

Referring now to FIG. 7, HP rotor shaft portion 50 of shaft 10 includes a thrust bearing enclosure 55 and an annular step 51 which projects axially away from thrust bearing enclosure 55 (step 51 projects in the axial direction opposite of thrust bearing enclosure 55). Step 51 also extends radially away from central portion 58 of rotor shaft portion 50.

Step 51 includes a circumferential surface 52 which forms a radially outermost edge of step 51. Circumferential surface 52 defines an oil slinger pocket 56. Oil slinger pocket 56 forms an annular groove which allows oil to be trapped and collected for drainage. Step 51 also includes a side surface 53 extending in the radial direction away from central portion 58. Surface 53 defines an annular groove 54 which is positioned radially underneath a portion of circumferential surface 52. Exemplary (but in no way limiting) dimensions of step 51 are as follows: h=2.625 inches and g=2.4 inches.

Oil deflector 60 includes heat shields 63, a set of seal rings 61 and another set of seal rings 62. Heat shields 63 protect seal rings 61 and 62 and other turbine components from radiated heat. Seal Rings 61 and 62 each encircle a portion of step 51. Each of seal rings 61 and 62 has a radially innermost edge which is in close proximity to circumferential surface 52. A small working clearance is defined between the radially innermost edge of each of seal rings 61 and 62 and circumferential surface 52 which forms the radially outermost edge of step 51. Seal rings 61 and 62 of oil deflector 60 provide a seal against oil leakage which travels axially along shaft 10. An annular chamber 64 formed between the sets of seal rings 61 and 62 and opposite to oil slinger pocket 56 collects oil so that it can be drained.

Step 51 provides a rotor geometry which prevents the overheating of oil in the area of rotor 10 near oil deflector 60. Oil carbonization in the area of oil deflector 60 can thus be prevented. In particular, annular groove 54 minimizes the amount of heat conductive material forming step 51 and thus diminishes the heat transferred to the area near seal rings 61 and 62 through the heat conductive material forming HP shaft portion 50. Heat conductive material which is "missing" from step 51 to form annular groove 54 is thus not available to conduct heat. Moreover, air flowing in groove 54 will cool step 51 and the part of central portion 58 which is close to groove 54, particularly as shaft 10 rotates at a high speed. Rotor portion 50, and hence the oil in the vicinity of oil deflector 60, will thus not be overheated. The temperature of the oil will remain below 300° F., the temperature needed for oil to carbonize. Oil carbonization near oil deflector 60 is thus prevented. Damage to shaft 10 and oil deflector 60 is therefore minimized.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while shaft 10 includes both steps 21 and 51, shaft 10 may include only one of steps 21 and 51. That is, shaft 10 may include an IP rotor shaft portion 20 which includes step 21 and is connected to a HP rotor shaft portion 50 which does not include step 51. Alternatively, shaft 10 may comprise HP rotor shaft portion 50 including step 51 and an IP rotor shaft portion 20 which does not include step 21.

The invention claimed is:

1. A turbine comprising:
an oil deflector including at least one set of seal rings; and
a shaft including at least one stage for holding a bucket and an annular step, the step having a circumferential surface in proximity to the seal rings and a side surface extending radially from a central portion of the shaft and defining a groove positioned radially underneath the circumferential surface, and the step projecting axially toward the at least one stage.

2. A turbine according to claim 1, wherein the step further includes another side surface extending radially from the central portion of the shaft, the groove extending axially toward the another side surface.

3. A turbine according to claim 2, wherein the shaft comprises an intermediate pressure rotary shaft.

4. A turbine according to claim 1, wherein the circumferential surface of the step defines an oil slinger pocket.

5. A turbine according to claim 1, wherein the annular step, including its circumferential surface and its side surface, is an integral portion of the shaft.

6. A turbine according to claim 1, further comprising a bearing, wherein the step is axially positioned between the bearing and the at least one stage, and the step projects axially away from the bearing.

7. A turbine comprising:
an oil deflector including at least one set of seal rings; and
a shaft including an annular step, the step having a circumferential surface in proximity to the seal rings, a side surface extending radially from a central portion of the shaft and defining a groove positioned radially underneath the circumferential surface, and a thrust bearing enclosure which extends radially from the central portion of the shaft, the step projecting axially away from the thrust bearing enclosure.

8. A turbine according to claim 7, wherein the shaft comprises a high pressure rotary shaft.

9. A rotary shaft of a turbine, the rotary shaft comprising:
an axially extending central portion;
at least one stage for holding a bucket; and
an annular step projecting radially from the central portion, the step having a circumferential surface and a radially extending side surface, the side surface defining a groove positioned radially underneath the circumferential surface, and the step projecting axially toward the at least one stage.

10. A rotary shaft according to claim 9, wherein the step further includes another side surface extending radially from the central portion of the shaft, the groove extending axially toward the another side surface.

11. A rotary shaft according to claim 10, wherein the shaft comprises an intermediate pressure rotary shaft.

12. A rotary shaft according to claim 9, wherein the circumferential surface of the step defines an oil slinger pocket.

13. A rotary shaft according to claim 9, wherein the annular step, including its circumferential surface and its side surface, is an integral portion of the shaft.

14. A rotary shaft of a turbine, the rotary shaft comprising:
an axially extending central portion; and
an annular step projecting radially from the central portion, the step having a circumferential surface and a radially extending side surface, the side surface defining a groove positioned radially underneath the circumferential surface; and
a thrust bearing enclosure extending radially from the central portion of the shaft, the step projecting axially away from the thrust bearing enclosure.

15. A rotary shaft according to claim 14, wherein the shaft comprises a high pressure rotary shaft.

16. A turbine comprising:
a first oil deflector including at least one set of seal rings;
a second oil deflector including at least one set of seal rings; and
a shaft including:
a first annular step having a circumferential surface in proximity to the seal rings of the first oil deflector; and
a second annular step having a circumferential surface in proximity to the seal rings of the second oil deflector;
wherein the first and second annular steps project in axially opposite directions.

17. A turbine according to claim 16, wherein the first annular step includes a radially extending side surface which defines a groove positioned radially underneath the circumferential surface of the first annular step, and the second annular step includes a radially extending side surface which defines a groove positioned radially underneath the circumferential surface of the second annular step.

18. A turbine according to claim 17, wherein the first annular step further includes another radially extending side surface, the groove positioned underneath the circumferential surface of the first annular step extending axially toward the another side surface.

19. A turbine according to claim 18, wherein the shaft further includes a thrust bearing enclosure extending radially from a central portion of the shaft, the second annular step projecting axially away from the thrust bearing enclosure.

20. A turbine according to claim 17, wherein the shaft further includes a thrust bearing enclosure extending radially from a central portion of the shaft, the second annular step projecting axially away from the thrust bearing enclosure.

21. A turbine according to claim 16, wherein at least one of the first and second annular steps includes a radially extending side surface which defines a groove positioned radially underneath the circumferential surface of the at least one first and second annular steps.

22. A turbine according to claim 16 further comprising:
a bearing axially positioned between the first and second annular steps, each of the first and second annular steps projecting away from the bearing.

23. A turbine according to claim 16, wherein the first annular step is axially positioned between the bearing and a first set of stages for holding the buckets, and the second annular step is axially positioned between the bearing and a second set of stages for holding buckets, wherein the first annular step projects axially toward the first set of stages and the second annular step projects axially toward the second set of stages.

* * * * *